United States Patent
Hinterberger et al.

(10) Patent No.: US 11,621,446 B2
(45) Date of Patent: Apr. 4, 2023

(54) BATTERY, PARTICULARLY FOR A MOTOR VEHICLE, AND METHOD FOR OPERATING A BATTERY

(71) Applicant: AUDI AG, Ingolstadt (DE)

(72) Inventors: Michael Hinterberger, Großmehring (DE); Berthold Hellenthal, Schwanstetten (DE)

(73) Assignee: AUDI AG, Ingolstadt (DE)

( * ) Notice: Subject to any disclaimer, the term of this patent is extended or adjusted under 35 U.S.C. 154(b) by 33 days.

(21) Appl. No.: 16/961,379

(22) PCT Filed: Nov. 19, 2018

(86) PCT No.: PCT/EP2018/081778
§ 371 (c)(1),
(2) Date: Jul. 10, 2020

(87) PCT Pub. No.: WO2019/137670
PCT Pub. Date: Jul. 18, 2019

(65) Prior Publication Data
US 2021/0083339 A1    Mar. 18, 2021

(30) Foreign Application Priority Data
Jan. 15, 2018  (DE) ..................... 10 2018 200 581.8

(51) Int. Cl.
*H01M 10/615* (2014.01)
*H01M 10/625* (2014.01)
(Continued)

(52) U.S. Cl.
CPC ....... *H01M 10/615* (2015.04); *H01M 10/425* (2013.01); *H01M 10/486* (2013.01);
(Continued)

(58) Field of Classification Search
CPC ............ H01M 10/615; H01M 10/625; H01M 10/654; H01M 10/42; H01M 10/425; H01M 10/48; H01M 10/486; H01M 50/569
See application file for complete search history.

(56) References Cited

U.S. PATENT DOCUMENTS 3,978,393 A    8/1976   Wisner et al.
5,281,792 A    1/1994   Lee et al.
(Continued)

FOREIGN PATENT DOCUMENTS

DE    102010000267 A1 *  8/2011  .............. B60L 58/21
DE    102010000267 A1    8/2011
(Continued)

OTHER PUBLICATIONS

International Preliminary Report on Patentability dated Jul. 21, 2020, including the Written Opinion of the International Searching Authority, in connection with corresponding international Application No. PCT/EP2018/081778 (7 pp.).

(Continued)

*Primary Examiner* — Karie O'Neill Apicella
(74) *Attorney, Agent, or Firm* — Maier & Maier, PLLC

(57) ABSTRACT

A battery, particularly for a motor vehicle, including at least two battery cells, wherein at least one circuit branch is connected to a respective positive pole and negative pole of the respective battery cell, which includes a heating unit, which can be connected in parallel to the respective battery cell by a switching element of the circuit branch; and a control device, which is configured to switch the switching elements of the respective circuit branch between an electrically conductive and an electrically blocking state in order to heat the battery cells, perform active balancing of the
(Continued)

battery cells, and/or discharge the battery cells. The invention furthermore relates to a method for operating a battery.

13 Claims, 4 Drawing Sheets

(51) Int. Cl.
*H01M 10/654* (2014.01)
*H01M 10/42* (2006.01)
*H01M 10/48* (2006.01)
*H02J 7/00* (2006.01)
*H01M 50/569* (2021.01)

(52) U.S. Cl.
CPC ....... *H01M 10/625* (2015.04); *H01M 10/654* (2015.04); *H01M 50/569* (2021.01); *H02J 7/0016* (2013.01); *H01M 2010/4271* (2013.01); *H01M 2220/20* (2013.01)

(56) References Cited

U.S. PATENT DOCUMENTS

2013/0280560 A1* 10/2013 Lim .................... H01M 50/574
429/61
2015/0064534 A1 3/2015 Lohmann et al.

FOREIGN PATENT DOCUMENTS

| DE | 102011088440 A1 * | 6/2013 | ............ H02J 7/0016 |
|----|----|----|----|
| DE | 102011088440 A1 | 6/2013 | |
| DE | 102012111817 A1 | 6/2014 | |
| DE | 102013221747 A1 | 4/2015 | |
| DE | 102015002077 B3 | 6/2016 | |
| EP | 2421083 A1 | 2/2012 | |
| EP | 3057172 A1 | 8/2016 | |
| JP | 2004-063397 A | 2/2004 | |
| WO | 2012/019740 A1 | 2/2012 | |
| WO | 2013/113438 A1 | 8/2013 | |
| WO | 2013/186079 A1 | 12/2013 | |
| WO | 2016131792 A1 | 8/2016 | |

OTHER PUBLICATIONS

German Examination Report dated Nov. 5, 2018 in corresponding German Application No. 10 2018 200 581.8; 24 pages; Machine translation attached.

International Search Report with English translation and Written Opinion with machine translation dated Feb. 11, 2019 in corresponding International Application No. PCT/EP2018/081778; 19 pages.

Office Action dated Mar. 1, 2022, in connection with corresponding Chinese Application No. 201880086415.1 (15 pp., including machine-generated English translation).

* cited by examiner

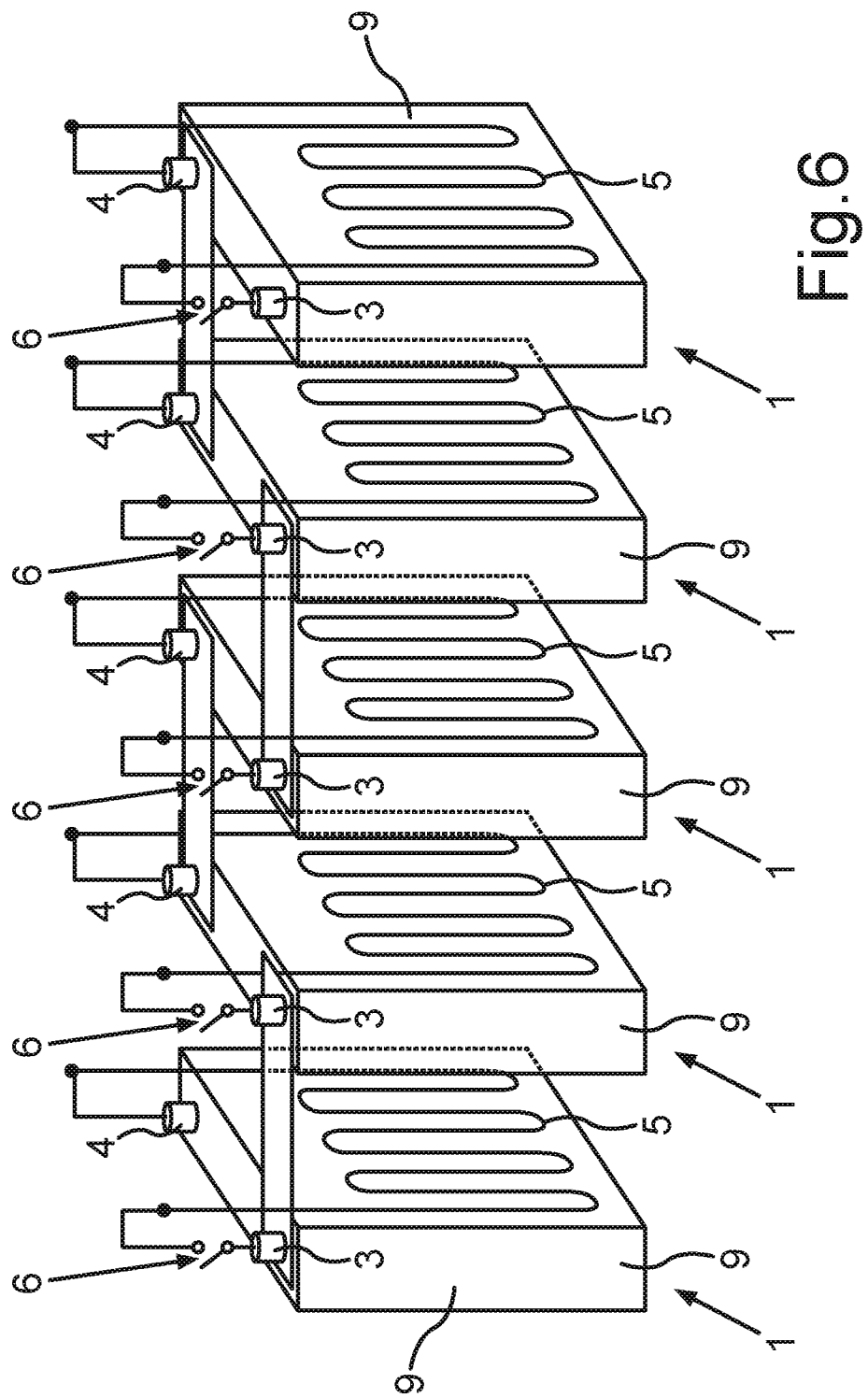

BATTERY, PARTICULARLY FOR A MOTOR VEHICLE, AND METHOD FOR OPERATING A BATTERY

FIELD

The disclosure relates to a battery for a motor vehicle, and a method for operating a battery. Furthermore, the invention also relates to a motor vehicle having such a battery.

BACKGROUND

It is known per se that batteries, particularly lithium-ion batteries, have a certain temperature sensitivity both when releasing energy and also when charging. Therefore, there have already been relatively many efforts to bring such batteries into an optimum temperature range. For example, DE 10 2010 000 267 A1 discloses an energy temperature regulator for a battery heater for heating a vehicle battery to a charging temperature. Individual battery elements are designed having a heating foil, wherein these heating foils are in turn connected in series.

EP 3 057 172 A1 discloses a heating device for a battery. The battery comprises multiple battery cells, wherein at least one heating foil is attached laterally to the battery cells by means of adhesive film.

DE 10 2012 111 817 A1 discloses an electrical energy accumulator. The electrical energy accumulator comprises individual battery cells, wherein a heating foil abuts the individual battery cells.

SUMMARY

It is an object of the present disclosure to provide a solution by which an operating state of a battery can be influenced particularly easily and effectively.

The battery according to the invention, particularly for motor vehicle, comprises at least two battery cells. The battery cells can be, for example, lithium-ion-based battery cells. However, other battery technologies or cell technologies are also possible. At least one circuit branch is connected here to a respective positive pole and negative pole of the respective battery cell, which comprises a heating unit which can be connected in parallel to the respective battery cell by means of a switching element of the circuit branch. Furthermore, the battery comprises a control device, which is configured to switch the switching elements of the respective circuit branch between an electrically conductive and an electrically blocking state in order to heat the battery cells, perform active balancing of the battery cells, and/or discharge the battery cells.

Of course, the battery can also comprise more than only two battery cells. Preferably, each of the battery cells is designed having such a circuit branch, which is connected to a respective positive pole and negative pole of the respective battery cell and comprises said heating unit, which can be connected in parallel to the respective battery cell by means of a switching element of the respective circuit branch. The switching elements are preferably electronic switches, wherein in principle the switching elements can also be mechanical switches, however. Field-effect transistors and bipolar transistors and diodes are typically used as switching elements in electronic switches. Electronic switches operate significantly faster than mechanical relays or mechanical switch contacts and operate without bounce and wear.

The control device can be both a central control device for the entire battery and also a decentralized control device having individual control elements or control units for each battery cell or also battery module. Due to said circuit branches having the heating units that can be connected in parallel to the respective battery cells, it is possible particularly easily and effectively to produce respective desired operating states in the battery, more precisely in the individual battery cells. It is possible easily by corresponding parallel connection of the respective circuit branches and thus the heating units to heat the individual battery cells, perform passive balancing of the battery cells, and/or discharge the battery cells if needed, preferably also to discharge them completely.

As soon as the switching elements have been switched to their electrically conductive state, the respective heating units of the circuit branches are supplied with energy by the respective battery cells. On the one hand, it is thus possible in a very simple manner to heat the individual battery cells as needed, in particular, for example, to preheat them to a suitable operating temperature before a charging procedure. Moreover, it is possible in a particularly simple manner by way of corresponding actuation of the switching elements and thus by corresponding connecting or disconnecting of the heating units to perform passive balancing of the battery cells during the charging of the battery cells.

Depending on which of the battery cells has an excessively high charge level, the respective circuit branches can be closed or opened, to convert respective energy of the battery cells into heat via the heating units. The actual control of the passive balancing preferably takes place via a higher logic, for example, via a corresponding microprocessor circuit of the control device, which decides, for example, on the basis of limit value criteria about the balancing of the individual battery cells. This procedure is very efficient, in particular more efficient than a method using a fixed shunt resistance and is also relatively simple and reliable. In particular, this procedure can also be used with lithium-ion batteries. For passive balancing in particular, it can be provided that the battery additionally has a cooling system suitable for this purpose, in order to emit the heat resulting via the passive balancing to the surroundings.

Moreover, it is possible in a simple manner in the battery according to the invention to heat the battery cells as needed by corresponding actuation of the switching elements of the individual circuit branches. For example, at very low ambient temperatures, it is thus possible to bring the battery cells to a favorable operating temperature before a charging procedure. It is also possible, for example, to bring the battery cells to a corresponding suitable operating temperature before the energy is released.

If the battery is installed in a motor vehicle, for example, and is used as a traction battery, it is thus conceivable that the battery cells have a very low temperature, particularly in winter. Before starting the motor vehicle, which can be a solely electric vehicle or a hybrid vehicle, it is possible in a simple manner in the battery according to the invention to preheat the battery cells by means of the respective heating units, so that the battery cells already have a suitable operating temperature when the motor vehicle is started.

In addition, it is possible in a simple manner in the battery according to the invention to discharge the battery cells via the respective circuit branches having the respective heating units. If the battery is used in a motor vehicle, it can thus be very useful, for example in the event of a crash, to discharge the battery completely or at least to discharge it to such an extent that it no longer poses a danger. In the battery according to the invention, this is possible in a simple manner by switching all the switching elements into their electrically conductive state, so that the individual battery cells can be discharged, in particular completely discharged, via the heating units connected in parallel. This is not only limited to a crash. For example, it would also be conceivable for the battery to be removed from a motor vehicle for maintenance or repair purposes. Before this happens, it can be provided, for example, that the individual battery cells are discharged by appropriate actuation of the switching elements to such an extent that the batteries can be handled safely.

In the battery according to the invention, it is therefore possible in a particularly simple and reliable manner to influence the operating state of the battery cells of the battery, whether to heat the battery cells, to discharge them, or to perform passive balancing between the battery cells.

One advantageous embodiment of the invention provides that the heating units are heating foils which comprise a heating coil embedded in a foil. The heating units are thus particularly easy to handle during the production of the battery. Furthermore, such heating foils can be attached to the battery cells in a particularly simple, flat manner at a suitable point to enable particularly effective heating of the battery cells.

In a further advantageous design of the invention, it is provided that the heating foils are arranged inside the respective cell housing of the battery cells on the outer circumference on respective cell windings of the battery cells. It is provided here that the respective foils of the heating foils are electrochemically resistant. Because the heating foils are arranged on the outside circumference on the respective cell windings of the battery cells inside the respective cell housing, the battery cells can be heated particularly quickly and efficiently if required. It is thus possible to bring the battery cells to a desired operating temperature within a particularly short time.

According to an alternative advantageous embodiment of the invention, it is provided that the heating units are arranged on the outside on respective cell housings of the battery cells. The heating units can again be, for example, said heating foils. This procedure is accompanied by the advantage that defective heating units can be replaced in a particularly simple manner, since the heating units are arranged on the outside and are therefore easily accessible on the respective cell housings of the battery cells. In addition, the heating units arranged on the outside on the respective cell housings of the battery cells can be interconnected particularly easily.

A further advantageous embodiment of the invention provides that the battery cells comprise a plurality of the circuit branches which are connected to the respective positive pole and negative pole of the respective battery cells. In other words, it can thus be provided that a plurality of the heating units per battery cell can be connected in parallel to the battery cell, via respective switching elements of the respective circuit branches. It is thus possible for the heating units to be arranged at different points on the battery cells. It is thus possible, for example, to take into consideration a present operating state of the respective battery cell. Heat typically rises. Specific regions of the respective battery cells can thus be selectively heated very deliberately, depending on how the respective cell windings or battery cells are constructed per se. In the course of balancing or also, for example, in the course of discharging the battery cells, provision can also be made for the heating units to be operated, for example, only in the vicinity of a respective base of the battery cells, if a cooler of the respective battery cells is seated there. It is thus possible in a simple manner in the course of balancing or also in the course of the fastest possible discharge of the battery cells to prevent overheating of the respective battery cells. Thus, for example, multiple heating units in the form of respective heating foils can be arranged at different points of the battery cells. It can also be taken into consideration here, for example, that the battery cells typically have a higher thermal conductivity in the radial direction than in the axial direction with respect to respective cell windings of the battery cells. In this case, it would be particularly advantageous, for example, if the respective battery cells were provided with respective heating foils on the outer circumference, wherein respective end faces can be completely omitted, however. By providing multiple heating units and corresponding circuit branches, it is possible in a particularly simple manner to set respective operating states of the battery cells particularly efficiently and effectively.

In a further advantageous design of the invention, it is provided that the battery cells each comprise at least one temperature sensor, wherein the control device is configured to switch the switching elements in dependence on respective temperature signals of the temperature sensors. The control device is thus preferably configured to switch the switching elements to preheat the battery cells, in particular before a charging procedure of the battery. Furthermore, multiple temperature sensors are on location per battery cell, so that respective temperatures can be detected at different points of the battery cells. This is particularly advantageous if a plurality of the circuit branches are provided for each battery cell. Selective and locally restricted energizing of the respective heating units can thus take place in the above-described manner. The at least one integrated temperature sensor per battery cell thus makes it possible for the battery cells to virtually monitor themselves.

A further advantageous embodiment of the invention provides that the control device is configured to switch the switching elements in dependence on a respective charge level of the battery to passively balance the battery cells. For example, it is possible that the battery cells comprise different sensors themselves, which can detect respective sensor values or measured values, on the basis of which a respective charge level of the battery cells can be concluded. The control device can thus, for example, actuate the respective switching elements knowing the respective charge levels of the battery cells, to perform passive balancing of the battery cells.

According to a further advantageous embodiment of the invention, it is provided that the control device is configured to switch the switching elements into the electrically conductive state to completely discharge the battery cells as soon a critical state of the battery has been determined. If the battery is used, for example, in a motor vehicle, it can thus be provided that the control device is configured to switch the switching elements into the electrically conductive state to completely discharge the battery cells as soon the control device receives a signal from at least one airbag control unit of the motor vehicle that the relevant airbag has been triggered. Other sensors of the motor vehicle, for example, of driver assistance systems, acceleration sensors, and the like, can also be used to transmit signals to the control device of the battery, by means of which said critical state of the battery can be determined. Furthermore, it is also possible that the critical state of the battery is that the battery itself has a defect, for example at the cell level. Thus, it can be provided that the control device of the battery can diagnose itself, wherein in case of an internal problem of the battery, the control device can also switch the switching elements into the electrically conductive state to completely discharge the battery cells. It is thus possible in a reliable manner for the battery to eliminate a potential danger from the battery cells as such as a result of their charge level, if necessary. The battery cells can be discharged, preferably completely discharged, in a particularly simple manner in the case of motor vehicles which have been involved in an accident or also for repairs on the motor vehicle.

A further advantageous embodiment of the invention provides that the control device is configured to switch the switching elements according to a predetermined pulse width modulation. It is thus possible in a simple manner by appropriately specifying the respective pulse width modulation to heat the battery cells as required, to perform passive balancing, and/or to discharge the battery cells.

A further advantageous embodiment of the invention provides that the control device has one control unit per battery cell, in particular in the form of a microcontroller, which is configured to switch the respective switching elements between the electrically conductive and electrically blocking state. The individual battery cells themselves are thus capable of actuating the respective switching elements. Alternatively or additionally, it is also possible for a higher-level controller, for example, also in the form of a microcontroller, to be provided, by means of which the individual switching elements of the respective circuit branches can be actuated for each battery cell. In principle, a redundant solution is also possible, in which the individual battery cells comprise the respective control units, wherein respective control units for actuating the switching elements are additionally provided for the entire battery or, for example, at the battery module level.

The motor vehicle according to the invention comprises the battery according to the invention or an advantageous embodiment of the battery according to the invention.

In the method for operating the battery according to the invention or in an advantageous embodiment of the battery according to the invention, the switching elements are switched between an electrically conductive and an electrically blocking state by means of the control device to heat the battery cells, to perform passive balancing of the battery cells, and/or to discharge the battery cells. Advantageous designs of the battery according to the invention are to be considered advantageous designs of the method according to the invention and vice versa, wherein the battery in particular comprises means for carrying out the method steps.

Further advantages, features, and details of the invention result from the following description of preferred exemplary embodiments and on the basis of the drawing. The features and feature combinations mentioned above in the description as well as the features and feature combinations mentioned below in the description of the figures and/or merely shown in the figures may be used not only in the combination specified, but also in other combinations or alone, without departing from the scope of the invention.

BRIEF DESCRIPTION OF THE DRAWINGS

In the figures:

FIG. 6 shows a perspective view of an interconnection of multiple battery cells according to a third embodiment.

Identical or functionally identical elements have been provided with the same reference symbols in the figures.

DETAILED DESCRIPTION

Figure 1:
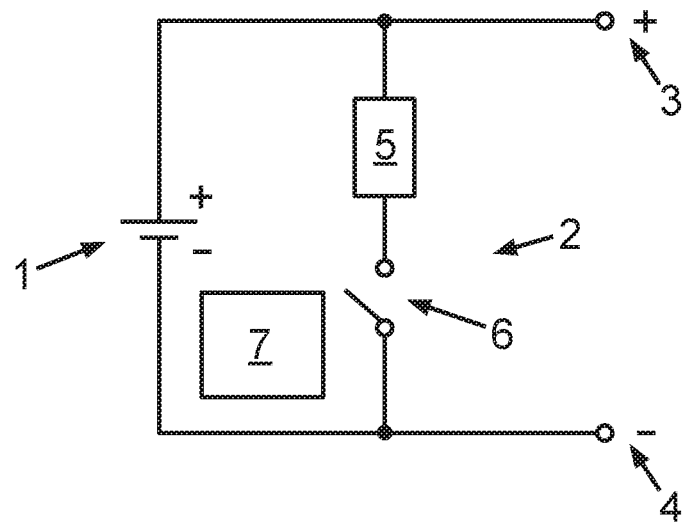
FIG. 1 shows a circuit diagram of a first embodiment of a battery cell, in which a circuit branch is connected here to a respective positive pole and negative pole of the battery cell, which comprises a heating unit which can be connected in parallel to the battery cell by means of a switching element of the circuit branch.

FIG. 1 shows a circuit diagram of a first embodiment of a battery cell 1, which is not designated in greater detail. The battery cell 1 can be, for example, a lithium-ion cell for a battery of a motor vehicle, in particular a solely electric vehicle or a hybrid vehicle. However, it is also possible for other cell types to be used instead of lithium-ion cells. A circuit branch 2 is connected here to a respective positive pole 3 and negative pole 4 of the battery cell 1. The circuit branch 2 comprises a heating unit 5, which can be connected by means of a switching element 6 of the switching branch 2 at the battery cell 1. Furthermore, a control device 7 is also provided, which is preferably a microcontroller. The control device 7 is configured to switch the switching element 6 into an electrically conductive and electrically blocking state to heat and/or discharge the battery cell 1.

A battery (not shown in greater detail) comprises a plurality of these battery cells 1 having the respective circuit branches 2 and associated control devices 7. When charging such a battery, it is possible that the respective control devices 7 moreover switch the respective switching elements 6 for passive balancing of the individual battery cells 1.

Figure 2:
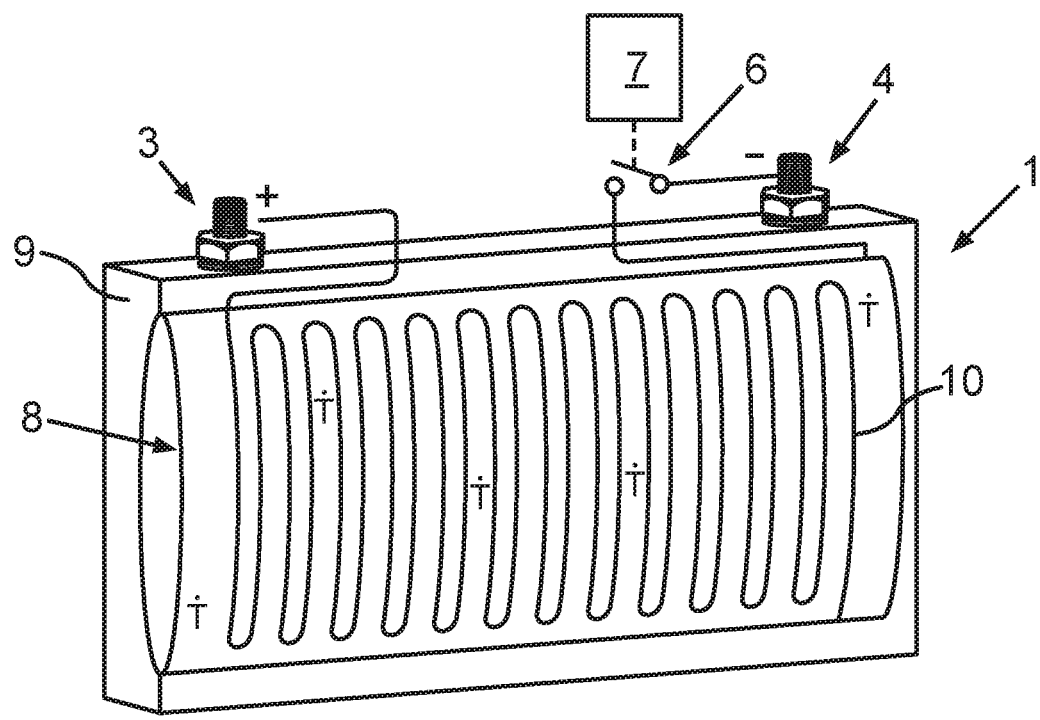
FIG. 2 shows a perspective view of the first embodiment of the battery cell.

The battery cell 1 is shown in a partially transparent perspective view in FIG. 2. The battery cell 1 comprises a cell winding 8, which is arranged in a cell housing 9 of the battery cell 1. The heating unit 5 is designed as a heating foil (not indicated in greater detail here) having a heating coil 10. Furthermore, the battery cell 1 comprises multiple integrated temperature sensors T. The control device 7 is configured to switch the switching element 6 in dependence on respective temperature signals of the temperature sensors T. The battery cell 1 can thus itself recognize via the integrated temperature sensors T what the temperature of the battery cell 1 is. It is thus possible, for example, to preheat the battery cell 1 to a suitable temperature before a charging procedure.

Figure 3:
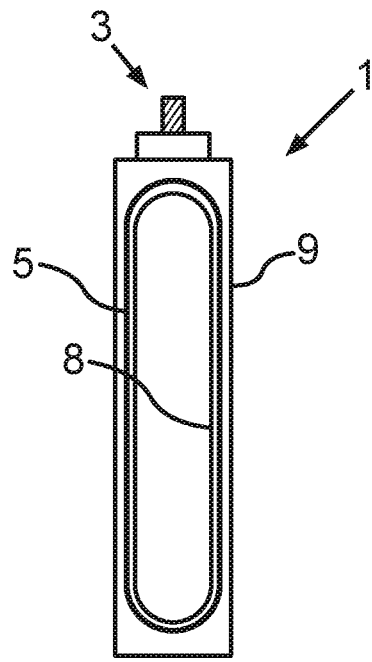
FIG. 3 shows a schematic sectional view of the first embodiment of the battery cell.

The first embodiment of the battery cell 1 is shown in a schematic sectional view in FIG. 3. In the present illustration, the cell winding 8 is schematically indicated, wherein the heating unit 5 designed as a heating foil is arranged on the outer circumference of the cell winding 8. As stated, the heating unit 5 in the present exemplary embodiment is a heating foil which comprises the heating coil 10 that is indicated in FIG. 2 and is embedded in a foil (not described in greater detail). The film is designed to be electrochemically resistant. Because the heating unit 5, which is designed as a heating foil, is arranged inside the cell housing 9 of the battery cell 1 and on the outer circumference of the cell winding 8, the cell winding 8 and an electrolyte surrounding it can be brought particularly rapidly to a suitable operating temperature.

Figure 4:
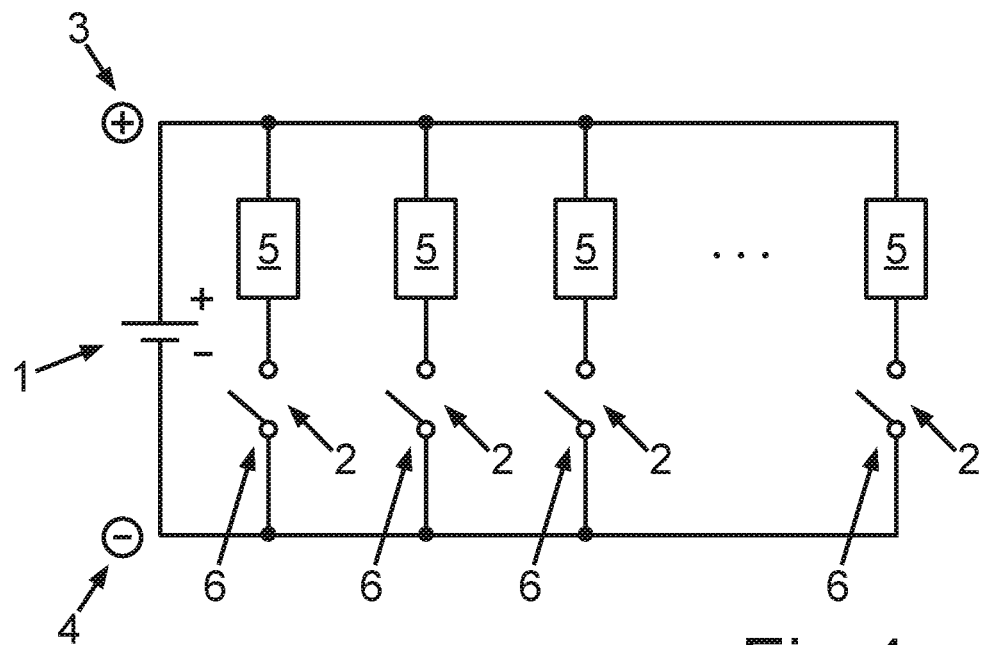
FIG. 4 shows a circuit diagram of a second embodiment of a battery cell, wherein a plurality of circuit branches having the heating units can be connected in parallel to the battery cell by means of respective switching elements.

FIG. 4 shows a circuit diagram of a second embodiment of the battery cell 1. A plurality of the circuit branches 2, which each comprise a heating element 5 and a switching element 6, are associated with the battery cell 1. The control device 7 is not shown in the present case. The respective circuit branches 2 are again connected to the respective positive pole 3 and to the negative pole 4 of the battery cell 1. The respective heating units 5 can in turn be connected in parallel to the battery cell 1 by means of the individual switching elements 2.

Figure 5:
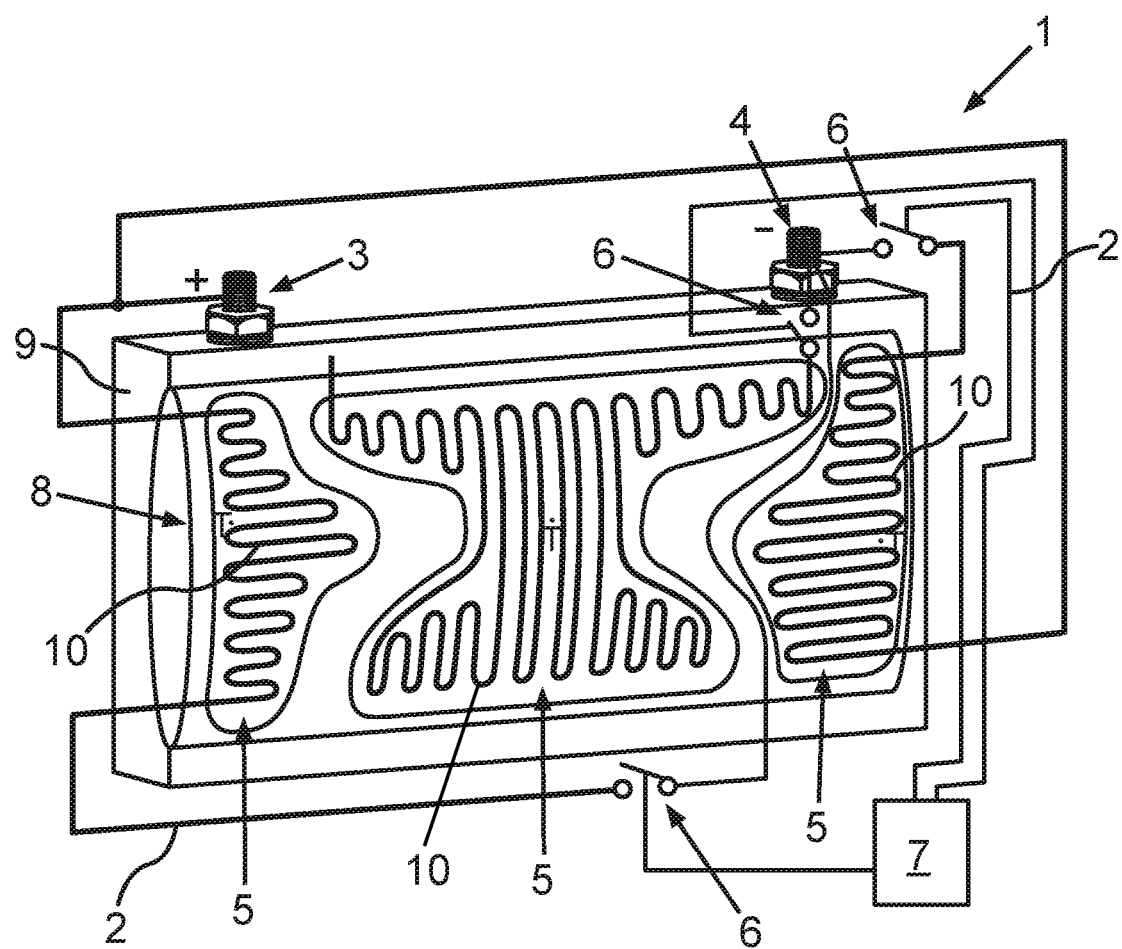
FIG. 5 shows a schematic perspective view of the second embodiment of the battery cell.

The second embodiment of the battery cell 1 is shown in a partially transparent perspective view in FIG. 5. The heating units 5 are again designed as heating foils having integrated heating coils 10. At least one temperature sensor T is provided per heating unit 5. However, it is also possible that far more or fewer of these temperature sensors T are also provided. In the case shown here, the heating units 5 designed as heating foils are in turn arranged inside the cell housing 9 of the battery cell 1 and attached to the outside of the cell winding 8 of the battery cell 1. The control device 7 can connect the respective circuit branches in parallel to the battery cell 1 as required or disconnect them from the battery cell 1. For this purpose, the control device 7 can switch each of the individual switching elements 6 either into an electrically conductive or into an electrically blocking state to heat the battery cell 1 or discharge it.

The embodiment of the battery cell 1 shown here can be installed multiple times in a battery (not shown here), for example, in a traction battery for an electric vehicle or hybrid vehicle. It is possible here that each of the battery cells 1 comprises the respective control device 7 for itself, wherein these devices can communicate with one another across cells. The control device 7 can thus actuate, for example, the respective switching elements 6 during a charging procedure of the respective battery cells 1 to perform passive balancing. Alternatively, however, it is also possible for the battery, in which a plurality of these battery cells 1 are installed, to comprise a higher-level control, which is configured to perform passive balancing of the individual battery cells 1 during a charging procedure, by closing or opening the individual switching elements 6 accordingly. In the case of passive balancing in particular, it can be provided that the individual switching elements 6 are actuated in accordance with a predetermined pulse width modulation. However, this can also be provided for heating the battery cells 1.

A third embodiment of battery cells 1 which are interconnected is shown in FIG. 6. In the exemplary embodiment shown here, the battery cells 1 again comprise circuit branches 2 (not described in greater detail) having respective heating elements 5. In contrast to the first two embodiments, however, it is provided here that the heating elements 5 are attached to the outside of respective cell housings 9 of the respective cell batteries 1. The heating elements 5 can again be, for example, heating foils. Moreover, it is also possible in the embodiment shown here that a plurality of these heating units 5 per battery cell 1 are provided on the outside at different points.

In all embodiments of the battery cells 1 shown here it is possible by means of the respective circuit branches 2 to heat the battery cells 1 on their own and also to discharge them if needed, in particular to discharge them completely. Moreover, if a plurality of these battery cells 1 are used in one battery module and/or in one battery, it is possible to perform passive balancing in the battery cells 1.

If the battery cells 1 are used, for example, in a traction battery of a hybrid vehicle or electric vehicle, it is thus easily possible to determine a temperature of the respective battery cells 1 by means of the integrated temperature sensors T before a charging procedure of the battery. Before the actual beginning of the charging procedure, the battery cells 1 can be brought to a suitable operating temperature via the heating units 5. During the actual charging procedure, it is moreover possible to perform passive balancing by deliberately opening and closing the switching elements 6, so that the most uniform possible charge level is achieved in all battery cells 1. This can be done by means of pulse width modulation, for example.

Moreover, it is also possible that in case of crash of a battery of a motor vehicle in which the battery cells 1 are installed, the battery cells 1 are completely discharged or are at least discharged to such an extent that the battery cells 1 and thus the entire battery no longer represents a danger. An airbag signal, which signals that a specific airbag of a motor vehicle has just been triggered, can be used, for example, as the trigger for the complete discharge of the battery cells 1. However, it is also possible that greatly varying other vehicle-side signals or battery-internal signals are used for this purpose, to effectuate the complete discharge of the individual battery cells 1. It is thus also possible, for example, that excess temperature development in one of the battery cells 1 is used as the trigger for discharging the other battery cells 1 by corresponding actuation of the switching elements 6, for example, to prevent a so-called thermal runaway at the module level and/or battery level.

Overall, a particularly simple and reliable solution is provided by the explained interconnection of the switching branches 2 to respective battery cells 1, by means of which an operating state of an entire battery and in particular respective individual operating states of the respective battery cell 1 can be influenced particularly simply and effectively.

The invention claimed is:

1. A battery for a motor vehicle, comprising:
   at least two battery cells, and
   a control device,
   wherein each of the at least two battery cells are provided with at least one circuit branch connected to a positive pole and a negative pole of the respective battery cell,
   wherein each of the at least one circuit branch comprises a switching element and a heating unit, the heating unit connectable in parallel to the respective battery cell via the switching element,
   wherein the control device is configured to switch the switching elements between an electrically conductive state and an electrically blocking state to heat the at least two battery cells, to perform active balancing of the at least two battery cells, and/or to discharge the at least two battery cells,
   wherein each heating unit comprises a heating foil formed as a heating coil embedded in a foil,
   wherein each heating foil is arranged inside a cell housing of the respective battery cell about an outer circumference of cell windings of the respective battery cell,
   wherein the control device is configured to switch the switching elements into the electrically conductive state to completely discharge the battery cells when a signal is received that airbags of the motor vehicle have deployed, and
   wherein the control device is further configured to switch the switching elements into the electrically conductive state to completely discharge the battery cells when a driver assistance system of the motor vehicle detects a critical state of the motor vehicle.

2. The battery as claimed in claim 1, wherein each of the at least two battery cells comprise a plurality of circuit branches.

3. The battery as claimed in claim 1, wherein the at least two battery cells each comprise at least one temperature sensor, and
wherein the control device is configured to switch the switching elements in dependence on respective temperature signals of the temperature sensors.

4. The battery as claimed in claim 1, wherein the control device is configured to switch the switching elements in dependence on a respective charge level of each of the at least two battery cells to passively balance the at least two battery cells.

5. The battery as claimed in claim 1, wherein the control device is configured to switch the switching elements according to a predetermined pulse width modulation.

6. The battery as claimed in claim 1, wherein the control device comprises a control unit provided in each of the at least two battery cells, the control unit configured to switch the respective switching element between the electrically conductive and the electrically blocking state.

7. A method for operating a battery of a motor vehicle comprising:
providing at least two battery cells and a control device, wherein:
each of the at least two battery cells are provided with at least one circuit branch connected to a positive pole and a negative pole of the respective battery cell; and
each of the at least one circuit branch comprises a switching element and a heating unit, the heating unit connectable in parallel to the respective battery cell via the switching element, and
switching, by the control device, of the switching elements between an electrically conductive state and an electrically blocking state in order to heat the at least two battery cells, to perform active balancing of the at least two battery cells, and/or to discharge the at least two battery cells,
wherein each heating unit comprises a heating foil formed as a heating coil embedded in a foil,
wherein each heating foil is arranged inside a cell housing of the respective battery cell about an outer circumference of cell windings of the respective battery cell,
wherein the control device is configured to switch the switching elements into the electrically conductive state to completely discharge the battery cells when a signal is received that airbags of the motor vehicle have deployed, and
wherein the control device is further configured to switch the switching elements into the electrically conductive state to completely discharge the battery cells when a driver assistance system of the motor vehicle detects a critical state of the motor vehicle.

8. The battery as claimed in claim 2, wherein, in each of the at least two battery cells, the heating foils are each arranged to heat a different portion of the respective battery cell.

9. The method as claimed in claim 7, wherein each of the at least two battery cells comprise a plurality of circuit branches.

10. The method as claimed in claim 7, wherein the control device comprises a control unit provided in each of the at least two battery cells, and
wherein each control unit switches the switching elements of the respective battery cell.

11. The method as claimed in claim 9, wherein, in each of the at least two battery cells, the heating foils are each arranged to heat a different portion of the respective battery cell.

12. The battery as claimed in claim 2, wherein, during active balancing and/or discharging of the at least two battery cells, only those heating units provided at a base of each of the at least two battery cells which abuts a cooler are switched into the electrically conductive state.

13. A method for operating a battery of a motor vehicle comprising:
providing at least two battery cells and a control device, wherein:
each of the at least two battery cells are provided with a plurality of circuit branches connected to a positive pole and a negative pole of the respective battery cell; and
each of the plurality of circuit branches comprises a switching element and a heating unit, the heating unit connectable in parallel to the respective battery cell via the switching element, and
switching, by the control device, of the switching elements between an electrically conductive state and an electrically blocking state in order to heat the at least two battery cells, to perform active balancing of the at least two battery cells, and/or to discharge the at least two battery cells,
wherein each heating unit comprises a heating foil formed as a heating coil embedded in a foil,
wherein each heating foil is arranged inside a cell housing of the respective battery cell about an outer circumference of cell windings of the respective battery cell,
wherein the control device is configured to switch the switching elements into the electrically conductive state to completely discharge the battery cells when a signal is received that airbags of the motor vehicle have deployed, and
wherein, during active balancing and/or discharging of the at least two battery cells, only those heating units provided at a base of each of the at least two battery cells which abuts a cooler are switched into the electrically conductive state.

\* \* \* \* \*